United States Patent
Jiang (10) Patent No.: US 10,614,339 B2
(45) Date of Patent: Apr. 7, 2020

(54) OBJECT DETECTION WITH NEURAL NETWORK

(71) Applicant: Nokia Technologies Oy, Espoo (FI)

(72) Inventor: Xiaoheng Jiang, Tianjin (CN)

(73) Assignee: Nokia Technologies Oy, Espoo (FI)

( * ) Notice: Subject to any disclaimer, the term of this patent is extended or adjusted under 35 U.S.C. 154(b) by 12 days.

(21) Appl. No.: 15/746,729

(22) PCT Filed: Jul. 29, 2015

(86) PCT No.: PCT/CN2015/085386
§ 371 (c)(1),
(2) Date: Jan. 22, 2018

(87) PCT Pub. No.: WO2017/015887
PCT Pub. Date: Feb. 2, 2017

(65) Prior Publication Data
US 2018/0211130 A1    Jul. 26, 2018

(51) Int. Cl.
*G06K 9/00* (2006.01)
*G06K 9/46* (2006.01)
(Continued)

(52) U.S. Cl.
CPC ......... *G06K 9/4628* (2013.01); *G06K 9/3233* (2013.01); *G06K 9/6268* (2013.01); *G06K 9/6273* (2013.01); *G06N 3/0454* (2013.01)

(58) Field of Classification Search
None
See application file for complete search history.

(56) References Cited

U.S. PATENT DOCUMENTS

| 9,436,895 B1* | 9/2016 | Jones | G06N 3/0454 |
| 2005/0049855 A1* | 3/2005 | Chong-White | G10L 19/173 |
| | | | 704/219 |

(Continued)

FOREIGN PATENT DOCUMENTS

| CN | 104102919 A | 10/2014 |
| CN | 104573731 A | 4/2015 |

(Continued)

OTHER PUBLICATIONS

International Search Report and Written Opinion of the International Searching Authority for related International Application No. PCT/CN2015/085386, dated Apr. 27, 2016, 9 pages.

(Continued)

*Primary Examiner* — Stephen P Coleman
(74) *Attorney, Agent, or Firm* — Ditthavong & Steiner, P.C.

(57) ABSTRACT

According to an example aspect of the present invention, there is provided an apparatus comprising at least one processing core, at least one memory including computer program code, the at least one memory and the computer program code being configured to, with the at least one processing core, cause the apparatus at least to provide an input data item to a first convolutional layer of an artificial neural network comprising a set of convolutional layers, process the input data item in the set of convolutional layers, define, in a feature map output from a last convolutional layer of the set of convolutional layers, a first feature map patch and a second feature map patch, and provide the first feature map patch to a first classifier and the second feature map patch to a second classifier.

19 Claims, 7 Drawing Sheets

(51) Int. Cl.
*G06K 9/62* (2006.01)
*G06K 9/32* (2006.01)
*G06N 3/04* (2006.01)

(56) References Cited

U.S. PATENT DOCUMENTS

| | | | |
|---|---|---|---|
| 2008/0025610 A1* | 1/2008 | Abdulkader | G06K 9/00852 382/185 |
| 2008/0201282 A1* | 8/2008 | Garcia | G06K 9/00281 706/20 |
| 2012/0191635 A1* | 7/2012 | Bigio | A61B 5/0059 706/13 |
| 2014/0180989 A1 | 6/2014 | Krizhevsky et al. | |
| 2015/0036920 A1 | 2/2015 | Wu et al. | |
| 2015/0117760 A1 | 4/2015 | Wang et al. | |
| 2015/0134583 A1* | 5/2015 | Tamatsu | G06N 3/08 706/25 |
| 2016/0217368 A1* | 7/2016 | Ioffe | G06N 3/04 |

FOREIGN PATENT DOCUMENTS

| | | |
|---|---|---|
| EP | 1768058 A2 | 3/2007 |
| EP | 2833295 A2 | 2/2015 |
| JP | 2005-267406 A | 9/2005 |
| JP | 2007087346 A | 4/2007 |
| JP | 2015-032308 A | 2/2015 |
| JP | 2015-095215 A | 5/2015 |
| WO | 2015078185 A1 | 6/2015 |
| WO | 2017015887 A1 | 2/2017 |

OTHER PUBLICATIONS

Office Action for related Japanese Patent Application No. 2018-504101, dated Apr. 5, 2019, 7 pages.
Okatani, "Deep Learning for Image Recognition", translation of bibliography, memoirs of The Japanese Society for Artificial Intelligence, vol. 28, No. 6, Nov. 2013, pp. 962-974.
Office Action for related European Patent Application No. 15899239. 6-1207, dated May 7, 2019, 6 pages.
Sermanet et al., "OverFeat: Integrated Recognition, Localization and Detection using Convolutional Networks", Feb. 24, 2014, pp. 1-16.
Krizevsky et al., "ImageNet classification with deep convolutional neural networks", IArticle in Advances in neural information processing systems 25(2), Jan. 2012 , pp. 1-9.
Giusti et al., "Fast image scanning with deep max-pooling convolutional neural networks", Feb. 2013, pp. 4034-4038.
Office Action for related Japanese Patent Application No. 2018-504101, dated Oct. 9, 2019, 6 pages.

* cited by examiner

OBJECT DETECTION WITH NEURAL NETWORK

CROSS-REFERENCE TO RELATED APPLICATION

This application claims priority from PCT Application Serial No. PCT/CN2015/085386, entitled "Object Detection with Neural Network," filed on Jul. 29, 2015, the contents of which are hereby incorporated herein in their entirety by this reference.

FIELD OF INVENTION

The present invention relates to detecting objects using a computational network.

BACKGROUND OF INVENTION

Machine learning is a discipline that explores the design of algorithms that can learn from data. Machine learning algorithms may be adapted to inputs to build a model, and can then be used on new data to make predictions. Machine learning has ties to statistics, artificial intelligence and optimization, and is often employed in tasks where explicit rule-based algorithms are difficult to formulate. Examples of such tasks include image recognition, character recognition and email spam filtering.

Artificial neural networks are computational tools capable of machine learning. In artificial neural networks, which may be referred to as neural networks hereinafter, interconnected computation units known as "neurons" are allowed to adapt to training data, and subsequently work together to produce predictions in a model that to some extent may resemble processing in biological neural networks.

Neural networks may comprise a set of layers, the first one being an input layer configured to receive an input. The input layer comprises neurons that are connected to neurons comprised in a second layer, which may be referred to as a hidden layer. Neurons of the hidden layer may be connected to a further hidden layer, or an output layer.

In some neural networks, each neuron of a layer has a connection to each neuron in a following layer. Such neural networks are known as fully connected networks. The training data is used to let each connection to assume a weight that characterizes a strength of the connection. Some neural networks comprise both fully connected layers and layers that are not fully connected. Fully connected layers in a convolutional neural network may be referred to as densely connected layers.

In some neural networks, signals propagate from the input layer to the output layer strictly in one way, meaning that no connections exist that propagate back toward the input layer. Such neural networks are known as feed forward neural networks. In case connections propagating back toward the input layer do exist, the neural network in question may be referred to as a recurrent neural network.

Convolutional neural networks, CNN, are feed-forward neural networks that comprise layers that are not fully connected. In CNNs, neurons in a convolutional layer are connected to neurons in a subset, or neighbourhood, of an earlier layer. This enables, in at least some CNNs, retaining spatial features in the input. CNNs may have both convolutional and fully connected layers.

SUMMARY OF THE INVENTION

The invention is defined by the features of the independent claims. Some specific embodiments are defined in the dependent claims.

According to a first aspect of the present invention, there is provided an apparatus comprising at least one processing core, at least one memory including computer program code, the at least one memory and the computer program code being configured to, with the at least one processing core, cause the apparatus at least to provide an input data item to a first convolutional layer of an artificial neural network comprising a set of convolutional layers, process the input data item in the set of convolutional layers, define, in a feature map output from a last convolutional layer of the set of convolutional layers, a first feature map patch and a second feature map patch, and provide the first feature map patch to a first classifier and the second feature map patch to a second classifier.

Various embodiments of the first aspect may comprise at least one feature from the following bulleted list:

- the input data item comprises an image
- the at least one memory and the computer program code are configured to, with the at least one processing core, cause the apparatus to derive the image by combining a set of scaled versions of an original image
- the first classifier comprises a first fully connected layer of the artificial neural network
- the second classifier comprises a second fully connected layer of the artificial neural network
- the set of convolutional layers comprises four convolutional layers
- the apparatus is arranged to process the input data item in the set of convolutional layers by normalizing an output of a previous convolutional layer before processing in a subsequent layer
- the apparatus is arranged to process the input data item in the set of convolutional layers by subsampling an output of a previous convolutional layer before processing in a subsequent layer
- the apparatus is arranged to process the input data item in the set of convolutional layers by performing local contrast normalization after a third convolutional layer
- the artificial neural network is configured to detect an image of a person
- the convolutional neural network is configured to detect an image of a pedestrian
- the first feature map patch and the second feature map patch are, at least in part, overlapping
- the first feature map patch is comprised in the second feature map patch.

According to a second aspect of the present invention, there is provided a method, comprising providing an input data item to a first convolutional layer of an artificial neural network comprising a set of convolutional layers, processing the input data item in the set of convolutional layers, defining, in a feature map output from a last convolutional layer of the set of convolutional layers, a first feature map patch and a second feature map patch, and providing the first feature map patch to a first classifier and the second feature map patch to a second classifier.

Various embodiments of the second aspect may comprise at least one feature from the following bulleted list:

- the input data item comprises an image
- the method comprises deriving the image by combining a set of scaled versions of an original image
- the first classifier comprises a first fully connected layer of the artificial neural network
- the second classifier comprises a second fully connected layer of the artificial neural network
- the set of convolutional layers comprises four convolutional layers processing the input data item in the set of convolutional layers comprises normalizing an output of a previous convolutional layer before processing in a subsequent layer processing the input data item in the set of convolutional layers comprises subsampling an output of a previous convolutional layer before processing in a subsequent layer processing the input data item in the set of convolutional layers comprises performing local contrast normalization after a third convolutional layer the artificial neural network is configured to detect an image of a person the convolutional neural network is configured to detect an image of a pedestrian the first feature map patch and the second feature map patch are, at least in part, overlapping the first feature map patch is comprised in the second feature map patch.

According to a third aspect of the present invention, there is provided an apparatus, comprising means for providing an input data item to a first convolutional layer of an artificial neural network comprising a set of convolutional layers, means for processing the input data item in the set of convolutional layers, means for defining, in a feature map output from a last convolutional layer of the set of convolutional layers, a first feature map patch and a second feature map patch, and means for providing the first feature map patch to a first classifier and the second feature map patch to a second classifier.

According to a fourth aspect of the present invention, there is provided a non-transitory computer readable medium having stored thereon a set of computer readable instructions that, when executed by at least one processor, cause an apparatus to at least provide an input data item to a first convolutional layer of an artificial neural network comprising a set of convolutional layers, process the input data item in the set of convolutional layers, define, in a feature map output from a last convolutional layer of the set of convolutional layers, a first feature map patch and a second feature map patch, and provide the first feature map patch to a first classifier and the second feature map patch to a second classifier.

According to a fifth aspect of the present invention, there is provided a computer program configured to cause a method in accordance with the second aspect to be performed.

INDUSTRIAL APPLICABILITY

At least some embodiments of the present invention find industrial application in enhancing machine-based pattern recognition.

DETAILED DESCRIPTION OF EXAMPLE EMBODIMENTS

In order to reduce a computational load in recognizing objects of varying sizes, a set of convolutional layers in an artificial neural network is re-used for at least two scales, such that convolutional processing takes place only once to perform object recognition at the at least two scales. Features of convolutional layers may be used to operate on a single input image, such that from a resulting feature map at least two feature map patches may be identified, corresponding to the at least two scales. Each of the at least two feature map patches can then be provided as input to a respective classifier arranged to perform object recognition at a respective scale.

Figure 1:
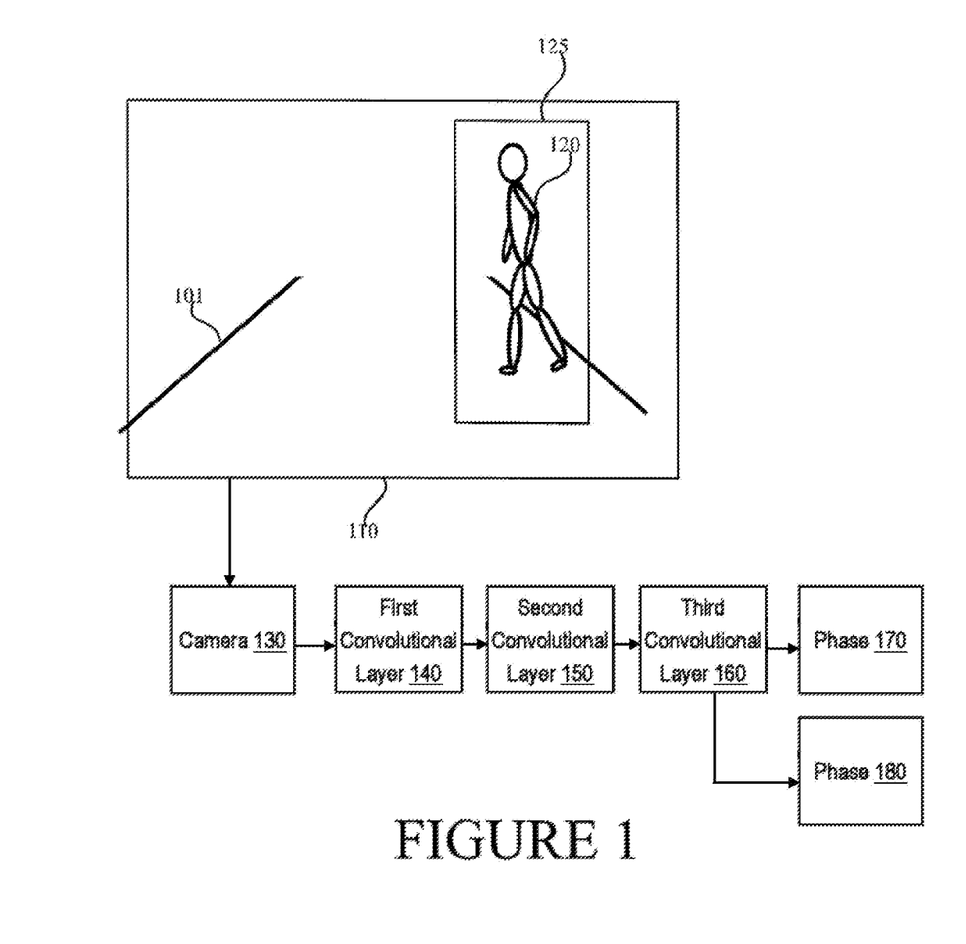
FIG. 1 illustrates an example system capable of supporting at least some embodiments of the present invention.

FIG. 1 illustrates an example system capable of supporting at least some embodiments of the present invention. FIG. 1 has a view 110 of a road 101, on which a pedestrian 120 is walking. While described herein in connection with detecting pedestrians, the invention is not restricted thereto, but as the skilled person will understand, the invention is applicable also more generally to pattern recognition in visual, auditory or other kind of data. For example, bicyclist recognition, handwriting recognition, facial recognition, traffic sign recognition, voice recognition, language recognition, sign language recognition and/or spam email recognition may benefit from the present invention, depending on the embodiment in question.

In FIG. 1, road 101 is imaged by a camera 130. Camera 130 is configured to capture a view 110 that covers the road, at least in part. Camera 130 may be configured to pre-process image data obtained from an image capture device, such as a charge-coupled device, CCD, comprised in camera 130. Examples of pre-processing include reduction to black and white, contrast adjustment and brightness balancing to increase a dynamic range present in the captured image. In some embodiments, the image data is also scaled to a bit depth suitable for feeding into an image recognition algorithm. Pre-processing may include selection of an area of interest, such as area 125, for example, for feeding into the image recognition algorithm. Pre-processing may be absent or limited in nature, since one benefit of CNNs is that in general input data need not be extensively pre-processed before providing it to the CNN. Camera 130 may be installed, for example, in a car that is configured to drive itself. Alternatively, camera 130 may be installed in a car designed to be driven by a human driver, but to provide a warning and/or automatic braking if the car appears to be about to hit a pedestrian or animal.

Data is provided from camera 130 to a convolutional neural network, which comprises phases 140, 150, 160, 170 and 180. Phase 140 comprises a first convolutional layer, which is configured to process the image received from camera 130. First convolutional layer 140 may comprise a plurality of kernels arranged to process data from the image received from camera 130. A section of the image provided to a kernel may be referred to as the receptive field of the kernel. An alternative term for a kernel is a filter. Receptive fields of neighbouring kernels may overlap to a degree, which may enable the convolutional neural network to respond to objects that move in the image, for example. In some embodiments, the kernels first convolutional layer 140 employ the same weights, meaning that while weights may differ between neurons comprised in a kernel, kernel weight tables are the same for each kernel of first convolutional layer 140. This reduces the number of independent weights and causes the convolutional neural network to process different sections of the image in a similar way. In, for example, pedestrian detection, this may be useful since a pedestrian may be present in any part of the image. Controlling the number of independent weights may also provide the advantage that training the convolutional neural network is easier.

First convolutional layer 140 may produce a plurality of feature maps. Second convolutional layer 150 may receive these feature maps, or be enabled to read these feature maps from first convolutional layer 140. Second convolutional layer 150 may use all feature maps of first convolutional layer 140 or only a subset of them. A subset in this regard means a set that comprises at least one, but not all, of the feature maps produced by first convolutional layer 140. Second convolutional layer 150 may be configured to process feature maps produced in the first convolutional layer, using a kernel or kernels of second convolutional layer 150, to produce second-layer feature maps. The second-layer feature maps may be provided, at least in part, to third convolutional layer 160 which may, in turn, be arranged to process the second-layer feature maps using a kernel or kernels of third convolutional layer 160, to produce at least one third-layer feature map as output.

Phase 170 of FIG. 1 comprises a first classifier, which may comprise, for example, a fully connected layer. In the example of FIG. 1, an output of the first classifier is a determination as to whether a pedestrian is comprised in view 110. The first classifier may comprise a softmax classifier, for example. Phase 170 is arranged to receive as input a first subsection, or patch, of at least one third-layer feature map, the first subsection corresponding to a scale that phase 170 is arranged to operate on to perform object recognition.

Phase 180 of FIG. 1 comprises a second classifier, which may comprise, for example, a fully connected layer. In the example of FIG. 1, an output of the second classifier is a determination as to whether a pedestrian is comprised in view 110. The second classifier may comprise a softmax classifier, for example. Phase 180 is arranged to receive as input a second subsection, or patch, of at least one third-layer feature map, the second subsection corresponding to a scale that phase 180 is arranged to operate on to perform object recognition.

In general, there may be more than two classifiers arranged to receive as input feature map data from third convolutional layer 160. In detail, each classifier may be arranged to receive as input a feature map patch that corresponds to a scale at which the classifier is arranged to perform object recognition. The feature map patches may at least in part overlap. At least one of the feature map patched may be comprised in another feature map patch. Where third convolutional layer 160 outputs a plurality of feature maps, a feature map patch may comprise a patch of each one of the feature maps output from the last convolutional layer. In other words, where a set of feature maps is output, the feature map patch may comprise a set of feature map patches.

The three convolutional layers illustrated in FIG. 1 is an example, as the number of convolutional layers may vary, for example, there may be four, five or six convolutional layers or indeed another number. The feature map patches for input to the classifiers may in each case originate from the last convolutional layer, regardless of how many convolutional layers there are. An advantageous effect is obtained from performing convolutional processing for more than one scale only once, since computer processing time and/or processor cycles are conserved when compared to a case where convolutional processing is performed separately for each scale.

Camera 130 and the CNN of FIG. 1 may be comprised, for example, in a mobile device, such as, for example, a mobile phone, smartphone or other similar mobile device. The mobile device may be attachable to a car, to enable warning a driver of the car in case a pedestrian may be ahead.

In some embodiments, camera 130 and the CNN are not comprised in the same apparatus. For example, camera 130 may be comprised in a car or a mobile device, and camera 130 may be arranged to provide, at least in part, and/or in processed and/or compressed form, its video feed to a CNN that runs in a backend server device, or a computer of the car. The server may provide indications of decisions it makes back to the car or mobile device, for example.

In some embodiments, CNN layers, such as for example first convolutional layer 140 and second convolutional layer 160, are comprised in different apparatuses. For example, a first apparatus may comprise camera 130 and first convolutional layer 140, while a second apparatus may be configured to run second convolutional layer 150. In principle, a third apparatus might run third convolutional layer 160. The first, second and/or third apparatuses may comprise mobile devices, for example, or alternatively at least one of them may comprise a backend server, for example. Where at least two of the first, second and third apparatuses comprise mobile devices, they may be arranged to communicate with each other, for example via a near-field communication interface, such as NFC or Bluetooth, for example.

Figure 2A:
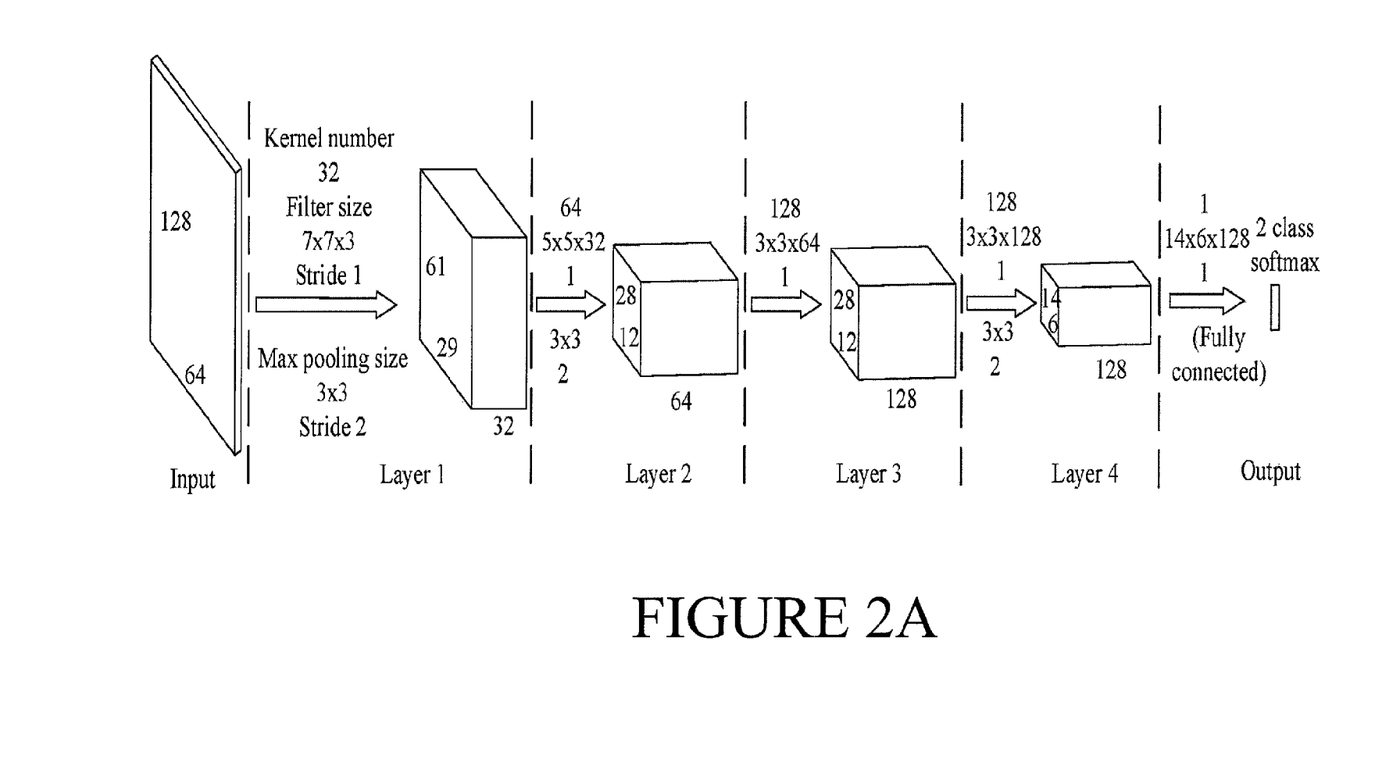
FIG. 2A and FIG. 2B illustrate an example CNN in accordance with at least some embodiments of the present invention.

FIG. 2A illustrates an example CNN in accordance with at least some embodiments of the present invention. The example CNN comprises five layers, denoted in FIG. 2A as Layer 1, Layer 2, Layer 3, Layer 4 and Output. Layers 1-4 are convolutional layers and the output layer is fully connected. The input window of the network of FIG. 2A has dimensions 128×64. The classifier in the output layer is arranged to receive a feature map patch with dimensions 14×6.

Figure 2B:
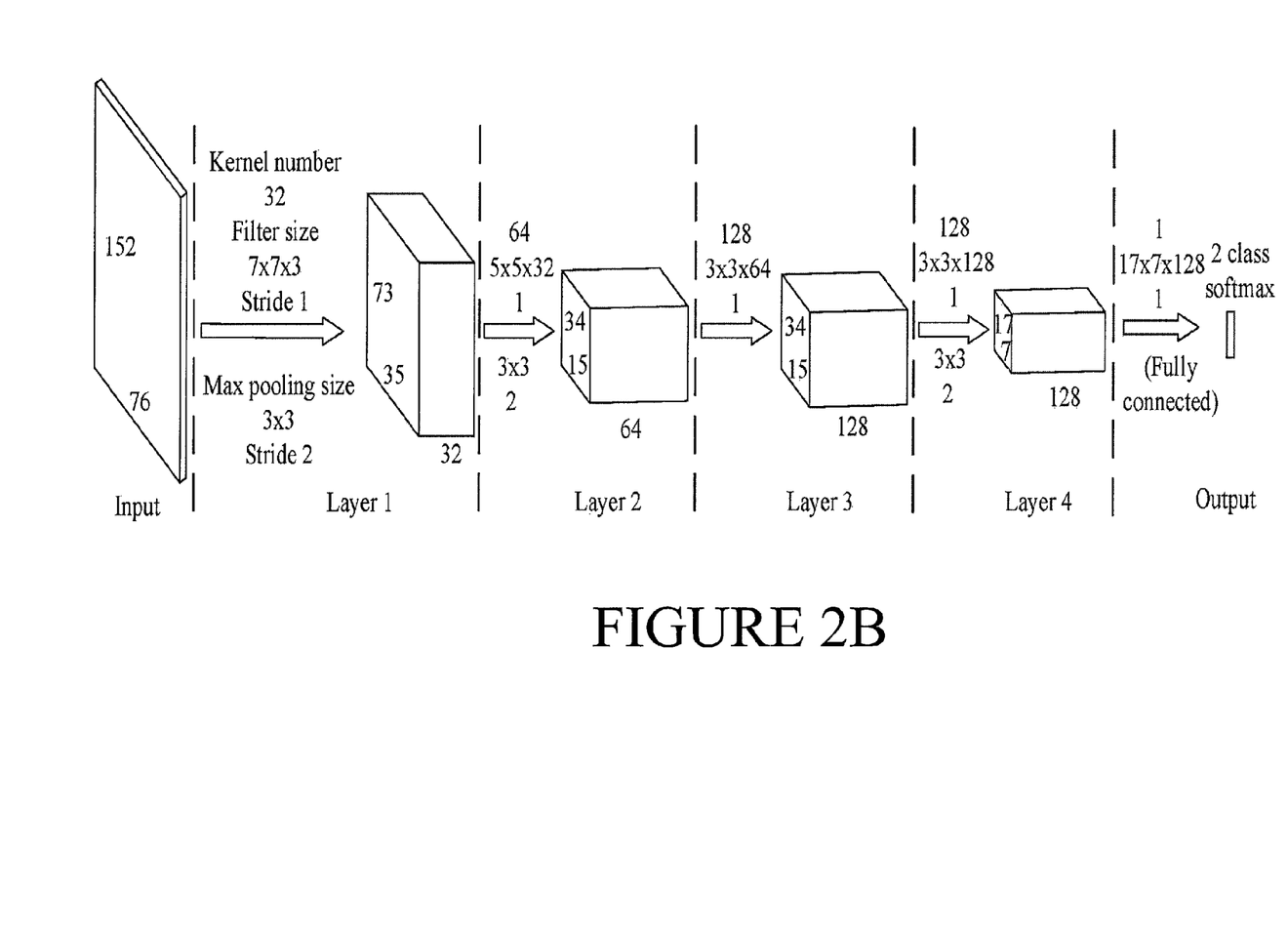

FIG. 2B illustrates an example CNN in accordance with at least some embodiments of the present invention. The example CNN comprises five layers, denoted in FIG. 2A as Layer 1, Layer 2, Layer 3, Layer 4 and Output. Layers 1-4 are convolutional layers and the output layer is fully connected. The input window of the network of FIG. 2A has dimensions 152×76. Layers 1-4 are the same as in the network of FIG. 2A. The classifier in the output layer is arranged to receive a feature map patch with dimensions 17×7.

The CNNs of FIGS. 2A and 2B thus differ in the dimensions of the input window, the dimensions of the feature map patch that is provided to the classifier and in the structure of the classifiers. In accordance with at least some embodiments of the present invention, a single image of sufficient dimensions to fill the larger input window is provided to layers 1-4, after which the feature map patches are determined from the output of the last convolutional layer and provided to separate classifiers of FIGS. 2A and 2B. Thus both classifiers can be provided with feature map patch input, by running the convolutional processing only once.

In the illustrated example, local contrast normalization operation follows the first three convolutional layers. Subsampling operation follows the local normalization operation. In general, the input image may comprise scaled versions of an original image. This may facilitate detecting objects of different sizes. The scaled versions of the original image may be at least partially overlapping in the input image, for example.

In the examples of FIGS. 2A and 2B, the first convolutional layer, Layer 1, filters the 128×68×3 input image with 32 kernels of size 7×7×3 with a stride of 1 pixel. The second convolutional layer takes as input the output of the first convolutional layer, which may be normalized and subsampled, for example. The second convolutional layer, Layer 2, filters its input with 64 kernels of size 5×5×32. The third convolutional layer, Layer 3, has 128 kernels of size 3×3×128 connected to the outputs of the second convolutional layer, which may also be normalized and subsampled, for example. The fourth convolutional layer, Layer 4, has kernels of size of 3×3×128.

Figure 3:
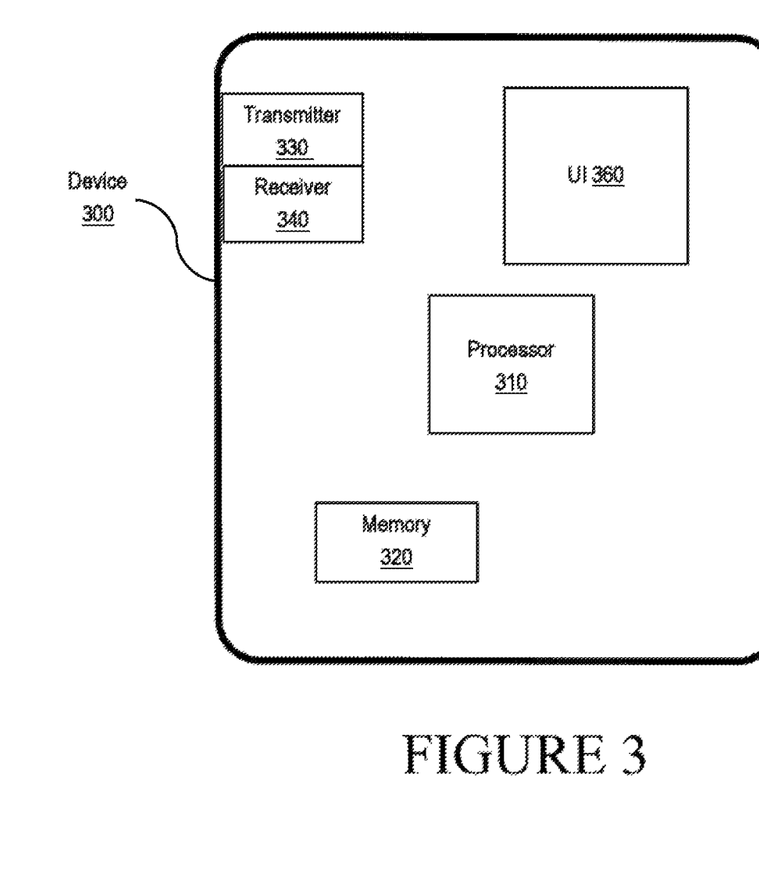
FIG. 3 illustrates an example apparatus capable of supporting at least some embodiments of the present invention.

FIG. 3 illustrates an example apparatus capable of supporting at least some embodiments of the present invention, for example by running a CNN. Illustrated is device 300, which may comprise, for example, a computer or computing device. Comprised in device 300 is processor 310, which may comprise, for example, a single- or multi-core processor wherein a single-core processor comprises one processing core and a multi-core processor comprises more than one processing core. Processor 310 may comprise a Qualcomm Snapdragon 800 processor, for example. Processor 310 may comprise more than one processor. A processing core may comprise, for example, a Cortex-A8 processing core manufactured by ARM Holdings or a Brisbane processing core produced by Advanced Micro Devices Corporation. Processor 310 may comprise at least one Qualcomm Snapdragon and/or Intel Core processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise magnetic, optical and/or holographic memory, for example. Memory 320 may be at least in part accessible to processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance WLAN, Ethernet, wideband code division multiple access, WCDMA, and/or worldwide interoperability for microwave access, WiMAX, standards, for example.

Device 300 may comprise user interface, UI, 360. UI 360 may comprise at least one of a display, a keyboard and a touchscreen. A user may be able to operate device 300 via UI 360, for example to configure an artificial neural network or to program a destination for driving.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. Device 300 may comprise a fingerprint sensor arranged to authenticate, at least in part, a user of device 300. In some embodiments, device 300 lacks at least one device described above.

Processor 310, memory 320, transmitter 330, receiver 340 and/or, UI 360 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
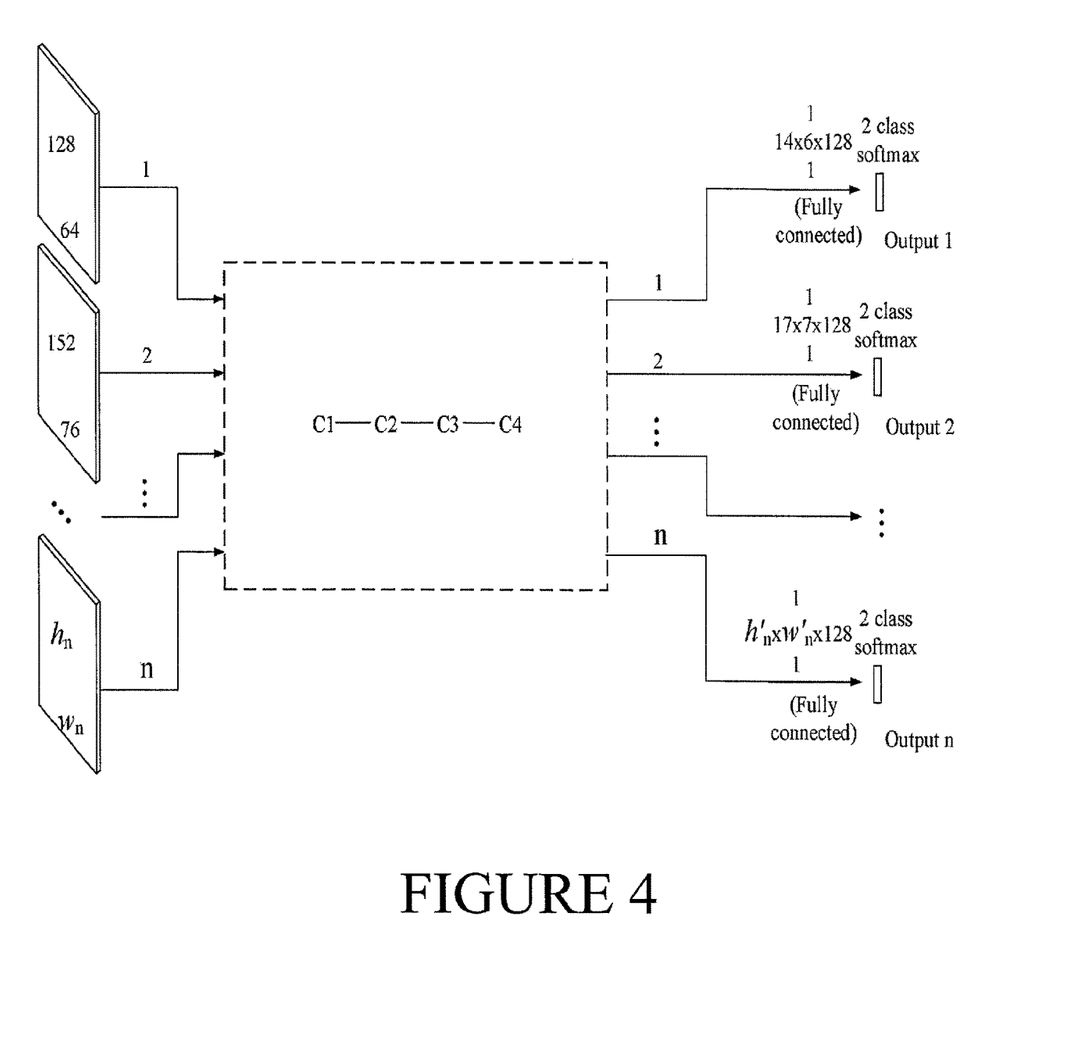
FIG. 4 illustrates an example artificial neural network in accordance with at least some embodiments of the present invention.

FIG. 4 illustrates an example artificial neural network in accordance with at least some embodiments of the present invention. On the left in the figure are input windows, having dimensions 128×64 for input 1, 152×76 for input 2 and, generically, $h_n \times w_n$ for input n. In the centre part of the figure is a set of convolutional neural network layers, denoted schematically as C1-C2-C3-C4. On the right-hand-side of the figure, are fully connected output layers which are arranged to act as classifiers. The classifier denoted Output 1 is arranged to receive a feature map patch of size 14×6 as input. This may mean, in detail, that this classifier receives a patch of 14×6 size from each of 128 feature maps output from the last convolutional layer. The classifier denoted Output 2 is arranged to receive a feature map patch of size 17×7 as input. This may mean, in detail, that this classifier receives a patch of 17×7 size from each of 128 feature maps output from the last convolutional layer. The classifier denoted Output n is arranged to receive a feature map patch of size $h_n' \times w_n'$ as input. This may mean, in detail, that this classifier receives a patch of $h_n' \times w_n'$ size from each of 128 feature maps output from the last convolutional layer. The classifiers may comprise softmax classifiers, for example.

In the example of FIG. 4, classifier Output 1 is arranged to operate on a feature map patch of dimensions 14×6 that is derived from the corresponding input window of dimensions 128×64, to perform object recognition at the scale Output 1 is configured to operate on. Similarly Output 2 to Output n are each configured to operate on a specific scale, and to receive feature map patches that are derived from a corresponding input window of a corresponding size. The convolutional processing need only be performed once, saving computational resources. The input windows may be at least in part overlapping input image sections in the input image. The feature map patches may be at least in part overlapping in the feature maps output from the last convolutional layer.

Figure 5:
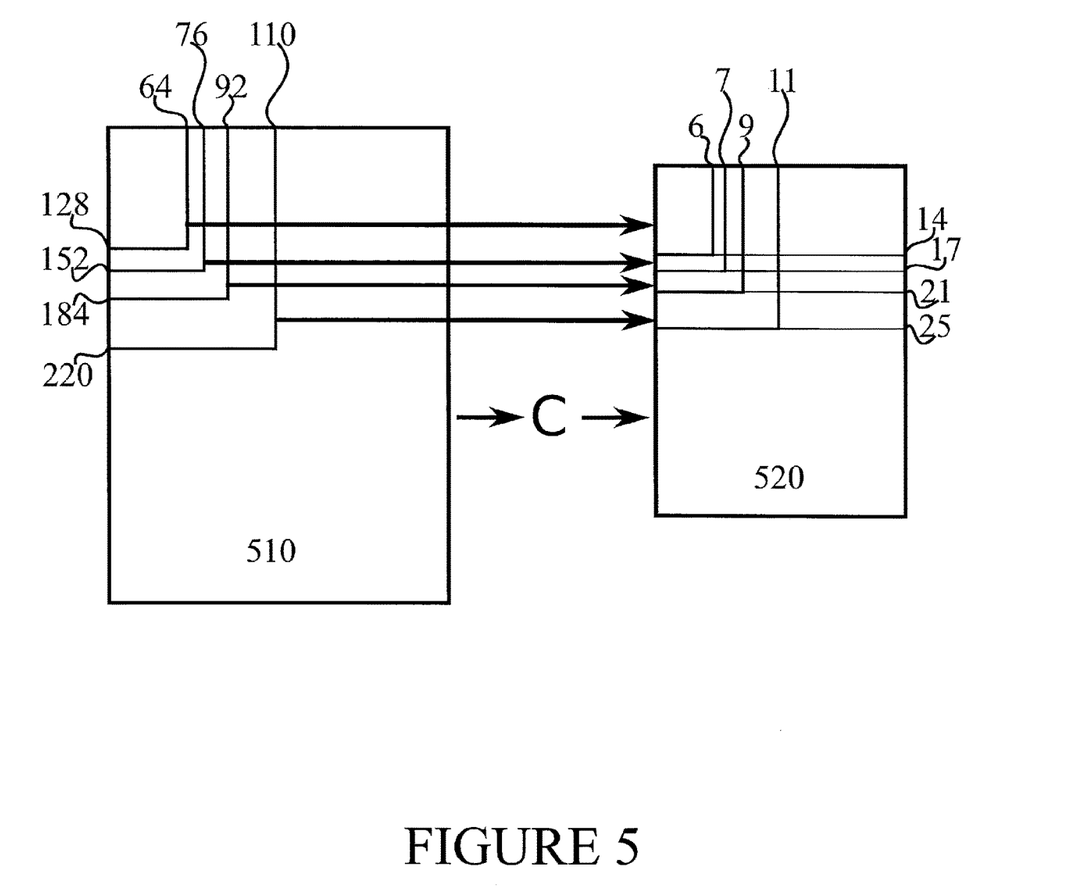
FIG. 5 illustrates how feature map patches are based on input image sections in accordance with at least some embodiments of the present invention.

FIG. 5 illustrates how feature map patches are based on input image sections in accordance with at least some embodiments of the present invention. On the left is an input image 510, and on the right a feature map 520 derived, via a set of convolutional layers C, from input image 510.

In detail, an input window, or input image section, having dimensions 128×64 yields, when run through the set of convolutional layers C, a feature map patch having dimensions 14×6. Similarly, an input image section having dimensions 152×76 yields, when run through the set of convolutional layers C, a feature map patch having dimensions 17×7. An input image section having dimensions 184×96 yields, when run through the set of convolutional layers C, a feature map patch having dimensions 21×9, and an input image section having dimensions 220×110 yields, when run through the set of convolutional layers C, a feature map patch having dimensions 25×11. All the feature map patches are obtained from the input image in one pass through the set of convolutional layers C. Each feature map patch may be provided to a classifier for object recognition at a scale the classifier is configured to operate on. Thus multi-scale object recognition may be achieved with a single pass through the set of convolutional layers C.

In a comparative performance evaluation using a group of four convolutional neural network based pedestrian detectors, the following results have been obtained. The performance evaluation used the INRIA pedestrian dataset for training, and both the INRIA pedestrian dataset and the Caltech-USA pedestrian dataset for testing. The method according to the present invention is labelled CNN-SF, denoting convolutional neural network with sharing features. Methods used for comparison are CNN-patch, denoting CNN with general patch-level object recognition, and CNN-image for image-level scanning using a prior art method. In patch-level scanning, window-wise features are directly extracted from each candidate window generated from an input image. Image-level scanning differs from this in that window-wise features are extracted from feature maps that are computed beforehand on the whole input image. In Table 1, MR denotes, in percentage, a miss rate of false positives per image. Table 1 illustrates that the CNN-SF method achieves similar accuracy as both CNN-patch and CNN-image.

TABLE 1

Comparison of detection accuracy

| | Dataset | | | | | |
|---|---|---|---|---|---|---|
| | INRIA | | | Caltech-USA | | |
| | Approach | | | | | |
| | CNN-patch | CNN-image | CNN-SF | CNN-patch | CNN-image | CNN-SF |
| MR (%) | 21.96 | 22.04 | 22.28 | 33.75 | 33.80 | 34.12 |

TABLE 2

Comparison of speed

| | Speed (Times) | | |
|---|---|---|---|
| Input image | CNN-patch | CNN-image | CNN-SF |
| 640 × 480 | 1 | 84 | 162 |

Table 2 illustrates a significant speedup of the object recognition process using CNN-SF with respect to both CNN-patch and CNN-image techniques. For example, a speedup by a factor of two is obtained relative to the CNN-image technique.

Figure 6:
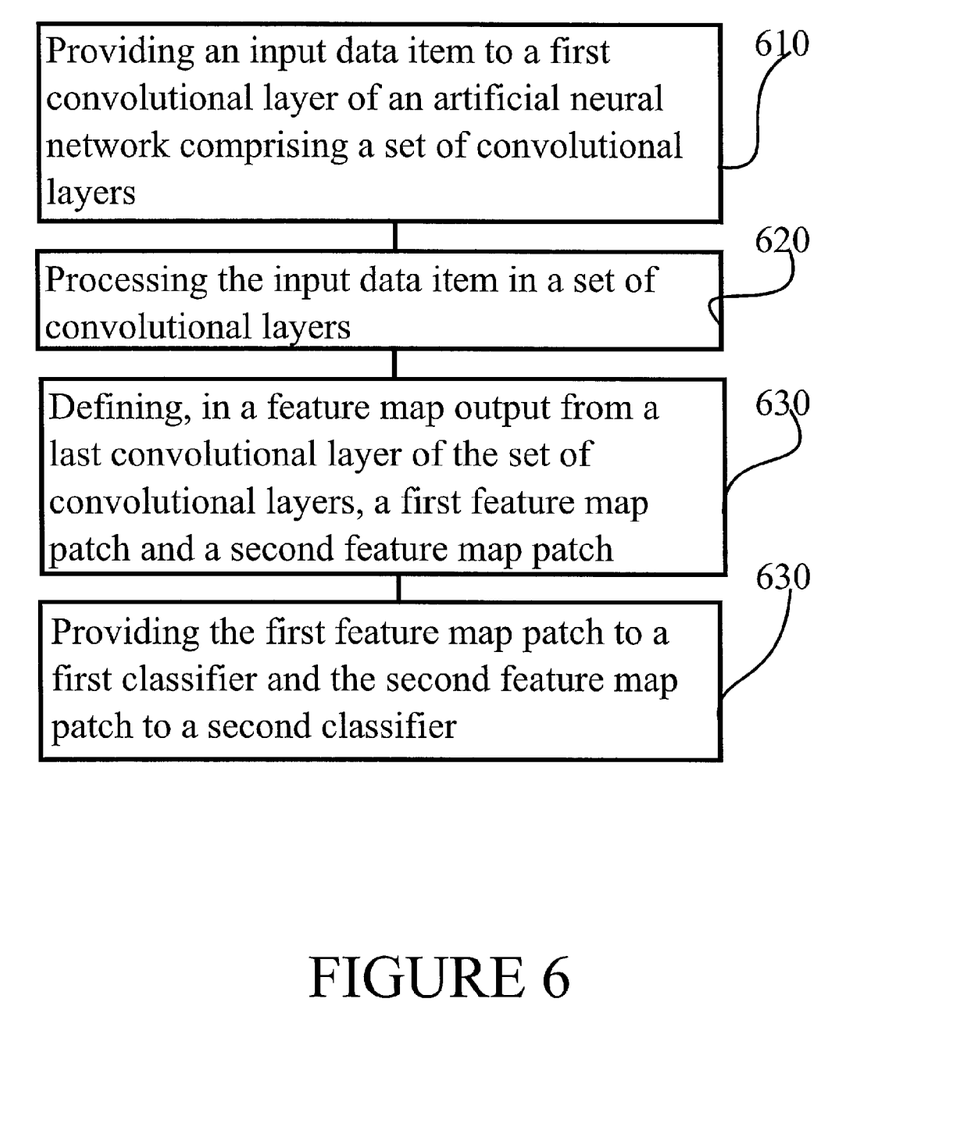
FIG. 6 is a flow chart of a method in accordance with at least some embodiments of the present invention.

FIG. 6 is a flow chart of a method in accordance with at least some embodiments of the present invention. The phases of the illustrated method may be performed in a device such as device 300 of FIG. 3, for example.

Phase 610 comprises providing an input data item to a first convolutional layer of an artificial neural network comprising a set of convolutional layers. Phase 620 comprises processing the input data item in the set of convolutional layers. Phase 630 comprises defining, in a feature map output from a last convolutional layer of the set of convolutional layers, a first feature map patch and a second feature map patch. Finally, phase 640 comprises providing the first feature map patch to a first classifier and the second feature map patch to a second classifier.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An apparatus comprising at least one processing core, at least one memory including computer program code, the at least one memory and the computer program code being configured to, with the at least one processing core, cause the apparatus at least to:
provide scaled versions of an input data item to a first convolutional layer of an artificial neural network comprising a set of convolutional layers;
process the input data item in the set of convolutional layers, wherein processing the input data item in the set of convolutional layers comprises performing local contrast normalization after a third convolutional layer;
define, in a feature map output from a last convolutional layer of the set of convolutional layers, a first feature map patch and a second feature map patch; and
provide the first feature map patch to a first classifier and the second feature map patch to a second classifier.

2. The apparatus according to claim 1, wherein the first classifier comprises a first fully connected layer of the artificial neural network.

3. The apparatus according to claim 1, wherein the second classifier comprises a second fully connected layer of the artificial neural network.

4. The apparatus according to claim 1, wherein the set of convolutional layers comprises four convolutional layers.

5. The apparatus according to claim 1, wherein processing the input data item in the set of convolutional layers comprises normalizing an output of a previous convolutional layer before processing in a subsequent layer.

6. The apparatus according to claim 1, wherein processing the input data item in the set of convolutional layers comprises subsampling an output of a previous convolutional layer before processing in a subsequent layer.

7. The apparatus according to claim 1, wherein the artificial neural network is configured to detect an image of a person.

8. The apparatus according to claim 1, wherein the convolutional neural network is configured to detect an image of a pedestrian.

9. The apparatus according to claim 1, wherein the input data item comprises an image.

10. The apparatus according to claim 9, wherein the at least one memory and the computer program code are configured to, with the at least one processing core, cause the apparatus to derive the image by combining a set of scaled versions of an original image.

11. The apparatus according to claim 1, wherein the first feature map patch and the second feature map patch are, at least in part, overlapping.

12. The apparatus according to claim 11, wherein the first feature map patch is comprised in the second feature map patch.

13. A method comprising:
providing scaled versions of an input data item to a first convolutional layer of an artificial neural network comprising a set of convolutional layers;
processing the input data item in the set of convolutional layers, wherein processing the input data item in the set of convolutional layers comprises performing local contrast normalization after a third convolutional layer;
defining, in a feature map output from a last convolutional layer of the set of convolutional layers, a first feature map patch and a second feature map patch; and
providing the first feature map patch to a first classifier and the second feature map patch to a second classifier.

14. The method according to claim 13, wherein the first classifier comprises a first fully connected layer of the artificial neural network.

15. The method according to claim 13, wherein the second classifier comprises a second fully connected layer of the artificial neural network.

16. The method according to claim 13, wherein the set of convolutional layers comprises four convolutional layers.

17. The method according to claim 13, wherein processing the input data item in the set of convolutional layers comprises normalizing an output of a previous convolutional layer before processing in a subsequent layer.

18. The method according to claim 13, wherein the input data item comprises an image.

19. The method according to claim 18, further comprising deriving the image by combining a set of scaled versions of an original image.

* * * * *